US008464098B2

(12) United States Patent
Marshall et al.

(10) Patent No.: US 8,464,098 B2
(45) Date of Patent: Jun. 11, 2013

(54) MICROCONTROLLER DEVICE, MICROCONTROLLER DEBUGGING DEVICE, METHOD OF DEBUGGING A MICROCONTROLLER DEVICE, MICROCONTROLLER KIT

(75) Inventors: Ray Marshall, Abbots Langley (GB); Thomas MacDonald, Plymouth, MI (US); Andrew Stephen Mihalik, Jr., Northville, MI (US)

(73) Assignee: Freescale Semiconductor, Inc., Austin, TX (US)

( * ) Notice: Subject to any disclaimer, the term of this patent is extended or adjusted under 35 U.S.C. 154(b) by 266 days.

(21) Appl. No.: 12/934,279

(22) PCT Filed: Apr. 15, 2008

(86) PCT No.: PCT/IB2008/051432
§ 371 (c)(1),
(2), (4) Date: Sep. 24, 2010

(87) PCT Pub. No.: WO2009/127902
PCT Pub. Date: Oct. 22, 2009

(65) Prior Publication Data
US 2011/0022897 A1 Jan. 27, 2011

(51) Int. Cl.
*G06F 11/00* (2006.01)
(52) U.S. Cl.
USPC .................................. 714/23; 714/27; 714/25
(58) Field of Classification Search
USPC .................................................... 714/27, 23
See application file for complete search history.

(56) References Cited

U.S. PATENT DOCUMENTS

| 2,794,123 | A | | 5/1957 | Younker | |
|---|---|---|---|---|---|
| 6,157,979 | A | * | 12/2000 | Barnett | 710/267 |
| 6,804,794 | B1 | * | 10/2004 | Robidoux et al. | 714/5.11 |
| 6,877,114 | B2 | | 4/2005 | Allen et al. | |
| 7,881,813 | B2 | | 2/2011 | Sibigtroth et al. | |
| 2005/0268016 | A1 | | 12/2005 | Mowry et al. | |
| 2006/0242501 | A1 | | 10/2006 | Kimelman et al. | |
| 2006/0253744 | A1 | * | 11/2006 | Mayes et al. | 714/43 |
| 2007/0237325 | A1 | * | 10/2007 | Gershowitz et al. | 380/30 |
| 2009/0249112 | A1 | * | 10/2009 | Diab | 714/2 |
| 2010/0064173 | A1 | * | 3/2010 | Pedersen et al. | 714/30 |
| 2010/0299563 | A1 | * | 11/2010 | Stachler | 714/39 |

FOREIGN PATENT DOCUMENTS
EP 0418932 A 3/1991

OTHER PUBLICATIONS

International Search Report and Written Opinion correlating to PCT/IB2008/051432 dated Jan. 16, 2009.

\* cited by examiner

*Primary Examiner* — Scott Baderman
*Assistant Examiner* — Sarai Butler (57) ABSTRACT

A microcontroller device comprising a receiver component configured to receive a one or more reset signals for the microcontroller device; an identification component configured to identify a source of the or each reset signals received by the receiver component; a time interval determining component configured to determine a length of a time interval in accordance with the identified source of the or each reset signals received by the receiver component; a voltage setting component configured to set a voltage of an output of the microcontroller device to a first value on receipt of a reset signal by the receiver component; and a control component configured to maintain the voltage of the output at the first value for the duration of the determined length of the time interval; and set the voltage of the output to a second value on substantial completion of the determined length of the time interval.

20 Claims, 5 Drawing Sheets

MICROCONTROLLER DEVICE, MICROCONTROLLER DEBUGGING DEVICE, METHOD OF DEBUGGING A MICROCONTROLLER DEVICE, MICROCONTROLLER KIT

FIELD OF THE INVENTION

This invention relates to a microcontroller device, to a microcontroller debugging device, to a method of debugging a microcontroller device a microcontroller kit, to a wireless communications device, and to an automobile.

BACKGROUND OF THE INVENTION

A microcontroller or microcontroller unit (MCU) is a highly integrated circuit (IC) that contains many of the functions of a typical computer system. In particular, a microcontroller uses a microprocessor as its central processing unit (CPU) and incorporates features such as (Random Access and Read Only) memory, a timing reference and input/output control units and peripherals, all on the same chip. Microcontrollers are particularly useful for applications (e.g. telephones, remote control devices, toys, automotive electronics etc.) that require a large number of operating decisions to be made. For these applications, it is generally easier to use the computational power of a microcontroller than discrete logic. In view of the complex functionality of a microcontroller, a variety of errors can occur therein (e.g. illegal instructions, phase lock loop [PLL] loss of lock, loss of system clock, software errors etc.) which necessitate the reset of the microcontroller, to restore it to a normal condition (or an initial state). In addition, a microcontroller often includes an internal power-on reset (POR) component, which ensures that the microcontroller is cleanly reset on powering-up.

A microcontroller also typically includes a reset input pin (which allows external devices to reset the microcontroller) and a reset output pin; wherein the reset input pin and reset output pin are sometimes combined to form a universal bi-directional reset pin. On occurrence of an error condition, a logic unit in the microcontroller receives a corresponding reset signal. In response thereto, the logic unit asserts the output pin of the microcontroller whilst it processes the reset signal. Many microcontrollers comprise one or more reset registers, which store a log of reset events and identifiers of the sources thereof. When attempting to debug a microcontroller experiencing a spurious reset, the source of the reset must be known. However, a microcontroller's reset register is not always accessible to a debugger.

US Patent Application US20060242501 describes a system in which an integrated circuit is provided with diagnostic circuitry, such as serial scan chains or debug bus access circuits, with which communication is established using an interface circuit coupled with a bi-directional serial link to an external diagnostic device. The bi-directional serial link carries both data and control signals.

U.S. Pat. No. 6,877,114 describes an electronic control unit (ECU) including a central processing unit (CPU), a non-volatile memory bank, a volatile memory bank and a state machine. The state machine is in communication with the CPU and functions to selectively capture information available on an internal bus of the CPU on a cycle-by-cycle basis and store the captured information in the volatile memory, which is also coupled to the CPU However, both US20060242501 and U.S. Pat. No. 6,877, 114 effectively describe hardware debuggers such as those provided by Lauterbach Datentechnik GmbH of Germany, or Ashling Microsystems Ltd of Ireland, that would allow the internal reset source register to be read and displayed. But connecting a debugger to a microcontroller is not always possible because of space, interface or assemble restrictions. Furthermore, or alternatively, a debugger may actually modify or mask the underlying cause of a reset signal.

SUMMARY OF THE INVENTION

The present invention provides a microcontroller device, a microcontroller debugging device, a method of debugging a microcontroller device a microcontroller kit, a wireless communications device, an automobile as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

Figure 1:
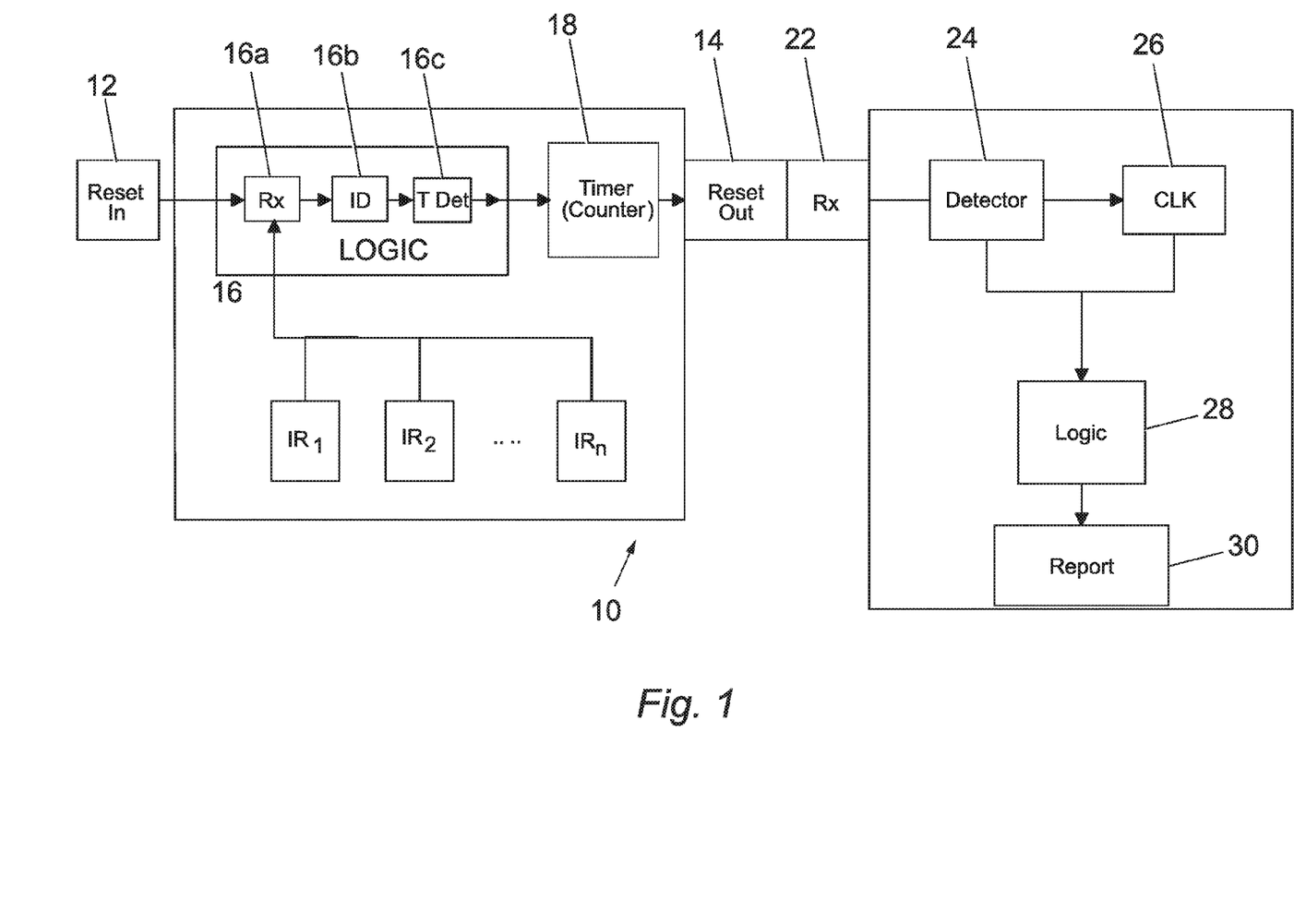
FIG. 1 is a block diagram of a microcontroller in accordance with an example of an embodiment of the invention, given by way of example.

Referring to FIG. 1, in common with traditional microcontrollers, a microcontroller 10 comprises a plurality of internal reset sources $IR_1, IR_2 \ldots IR_n$. The an example of a microcontroller 10 also comprises a reset input pin 12 and a reset output pin 14. Traditional microcontrollers employ the same amount of time ($\tau$) to process a reset signal, regardless of its source, thereby ensuring that the microcontroller's reset output pin is asserted for the same time-interval ($\tau$) for each reset event. In contrast, the microcontroller 10 attempts to encode the source of a reset onto an output signal emitted from its output pin 14.

In particular, the microcontroller 10 comprises a logic unit 16, which in turn comprises a receiver component 16a, an identification component 16b and a time interval determining component 16c. The receiver component 16a is configured to receive reset signals from inter alia the reset input pin 12 and the internal reset sources $IR_1, IR_2 \ldots IR_n$. The identification component 16b is configured to identify the source of a received reset signal; and the time interval determining component 16c is configured determine a value of a reset pulse duration $\tau^*(i)$ over which the microcontroller's reset output pin 14 is to be asserted. In particular, the time interval determining component 16c is configured to determine the value of the reset pulse duration τ*(i) in accordance with the source (i) identified by the identification component 16b of a received reset signal. For example, the reset pulse duration τ*(i) could be expressed as τ*(i)=τ+α$_i$Δ, wherein τ is a nominal reset pulse duration (e.g. the reset pulse duration of a traditional microcontroller); Δ is a constantly valued supplementary reset pulse duration; and α$_l$ is a scaling factor, whose value varies according to the source (i) of a received reset signal.

Of course, it will be realised that other expressions could be used for establishing a reset pulse duration τ*(i). In particular, the expressions could include non-linearities, or simple correspondence relationships (e.g. detailed in a look up table) between reset signal sources (i) and reset pulse durations τ*(i). Nonetheless, the over-riding principle is that the value of the reset pulse duration τ*(i) is not fixed, regardless of the source of a received reset signal. Instead, the value of the reset pulse duration τ*(i) varies according to the source of a received reset signal. The microcontroller 10 also comprises a timer 18 (e.g. counter or clock), which keeps track of the time over which the output pin 16 of the microcontroller is asserted; to ensure that the output pin 14 is asserted for a duration which substantially matches the reset pulse duration τ*(i).

Figure 2:
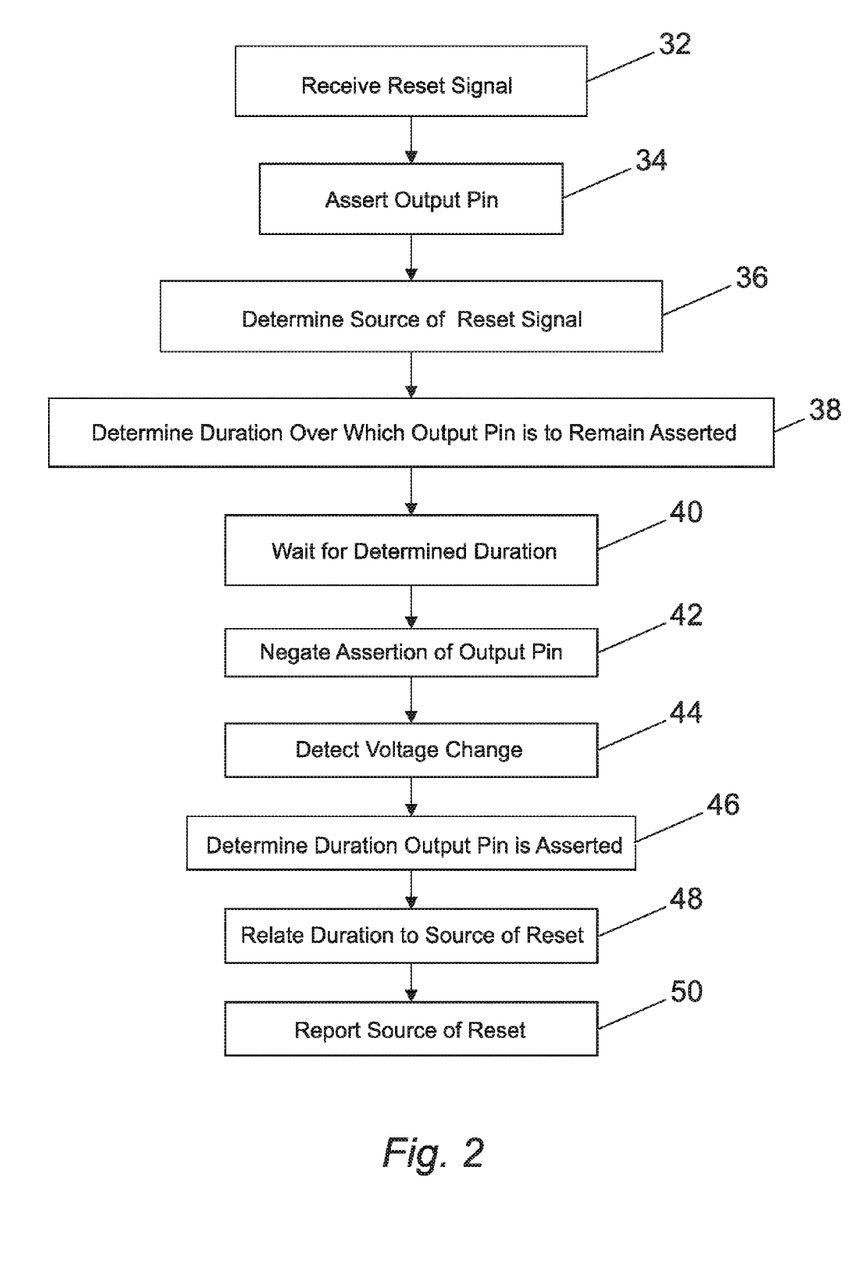
FIG. 2 is a flow-chart of an example of a method in accordance with an embodiment of the invention, given by way of example.

Referring to FIGS. 1 and 2 in combination, the microcontroller 10 may perform a method as illustrated in FIG. 2. As shown, the receiver component 16a of the logic unit 16 in the microcontroller 10 may be receiving 32 a reset signal. On receipt of the reset signal, the output pin 14 of the microcontroller 10 is asserted 34 and the identification component 16b of the logic unit 16 in the microcontroller 10 determines 36 the source of the received reset signal, for example substantially simultaneously with assertion of the output pin 14. From this information (and using the mechanism described above, for example), the time interval determining component 16c of the logic unit 16 determines 38 a reset pulse duration τ*(i), over which the output pin 14 of the microcontroller 10 is to remain asserted. The logic unit 16 and timer 18 of the microcontroller 10 wait 40 for the determined reset pulse duration τ*(i); and after the determined reset pulse duration τ*(i) has elapsed, the logic unit negates 42 the assertion of the output pin 14 of the microcontroller 10.

The information presented by the assertion of the output pin 14 may be used in any suitable manner. For example, a user may attach a storage oscilloscope to the microcontroller 10, to capture the voltage pulse from the output pin 14 of the microcontroller 10. On detecting the pulse, the user may measure its duration and then may look in a microcontroller reference manual for the microcontroller 10, to determine which reset source correlates with the measured pulse length.

Reverting to FIG. 1, a debugger 20 for the microcontroller 10 may for example be provided. In particular, the debugger 20 for the microcontroller 10 shown in FIG. 1 comprises a receiver 22, which is connectable to the output pin 14 of the microcontroller 10. The debugger 20 further comprises a voltage level detector 24 and a clocking component 26, wherein the voltage level detector 24 and the clocking component 26 collectively determine when, and for how long, the output pin 14 of the microcontroller 10 is asserted. The debugger 20 further comprises a logic unit 28 corresponding with that in the microcontroller 10. In particular, the logic unit 28 in the debugger 20 is configured to relate the duration of the time interval over which the output pin 16 of the microcontroller 10 is asserted, to the source of the originating reset signal in the microcontroller 10. The debugger 20 further comprises a reporting unit 30 configured to report to a user, the source of the determined originating reset signal in the microcontroller 10.

In this example, and referring to FIGS. 1 and 2 in combination, the voltage level detector 24 in the debugger 20 detects 44 a change in the voltage of the output pin 14 (of the microcontroller 10), when the output pin 14 is asserted. More particularly, the voltage level detector 24 and the clocking component 26 collectively determine 46 the duration for which the output pin 14 is asserted. The logic unit 28 in the debugger 20 relates 48 the determined duration to the source of the originating reset signal in the microcontroller. The logic unit 28 transmits this information to a reporting unit in the debugger 20, which in turn reports 50 the information to a user.

Figure 3:
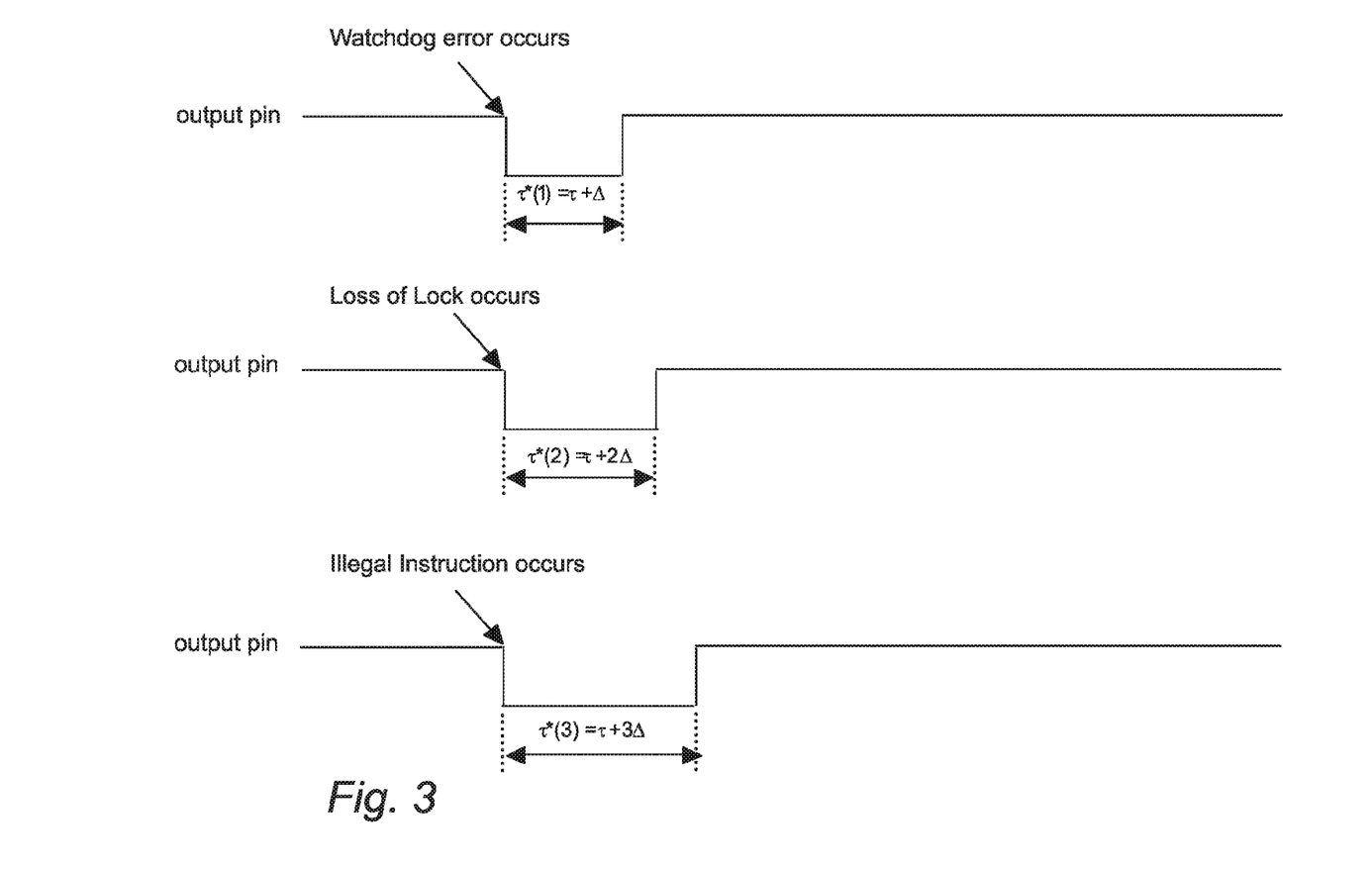
FIG. 3 is an exemplary timing diagram produced by executing the example of the method illustrated in FIG. 2, given by way of example.

An example of output signals emitted from the (output pin of the) microcontroller is shown in FIG. 3. For example, taking the reset pulse duration as 500 microseconds (i.e. τ=500 μs) and the supplementary reset pulse duration as 100 microseconds (i.e. Δ=100 μs) may cause the output pin to be asserted for five hundred microseconds for a watchdog reset, six hundred microseconds for a PLL loss of lock; and seven hundred microseconds for an illegal instruction. It will be appreciated that the above mentioned times during which the output pin is asserted for a given reset event are provided for the purposes of example only. In particular, different reset signal durations may be used from those specifically mentioned above depending on specific implementation of the preferred example.

Figure 4:
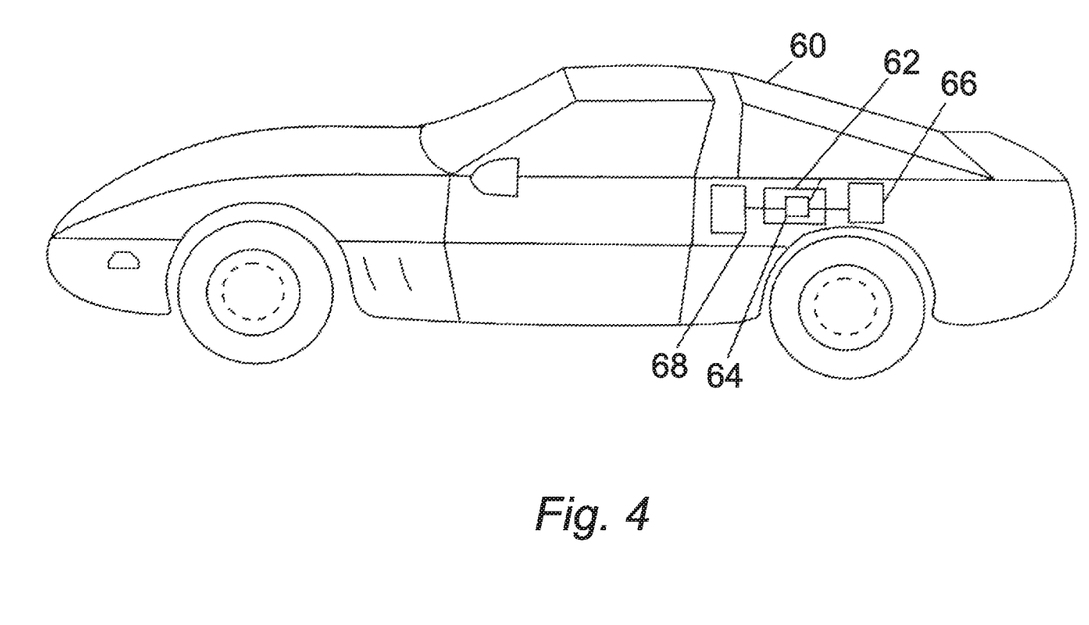
FIG. 4 schematically shows an example of an embodiment of an automobile including a microcontroller system.
Figure 5:
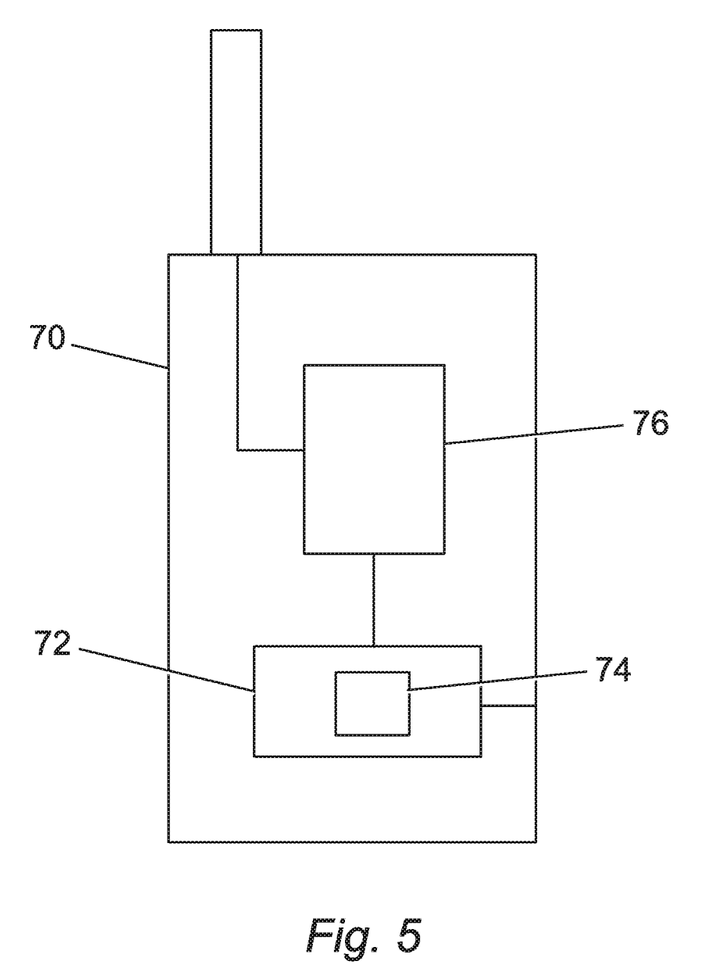
FIG. 5 schematically shows an example of an embodiment of a mobile phone including a microcontroller system.

The microcontroller can form part of a microcontroller system for example as shown in FIG. 4 in an automobile. The automobile 60 includes a microcontroller system 62 including the microcontroller circuit 64, which is used to protect the engine 66 and electronics or other circuitry 68 in the car. Similarly in FIG. 5 a mobile phone 70 includes a microcontroller system 72 including the microcontroller circuit 74, which is designed to protect the electronics and circuitry 76 in the mobile phone.

The invention may be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-ROM or diskette, stored with data loadable in a memory of a computer system, the data representing the computer program. The data carrier may further be a data connection, such as a telephone cable or a wireless connection.

In the foregoing specification, the invention has been described with reference to specific examples. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

It should be noted that the word "microcontroller" as used herein generally includes microcontrollers, microprocessors, micro-computers, single chip computers and the like, and systems incorporating the same. Similarly, the term "reset" is used to refer to the process of clearing any pending errors or events and bringing a system to normal condition or initial state, usually in a controlled manner.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate examples, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts and in order not to obfuscate or distract from the teachings.

Some of the above examples, as applicable, may be implemented using a variety of different information processing systems. For example, although FIG. 1 and the discussion thereof describe an exemplary microcontroller architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative examples may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one example the illustrated elements of a microcontroller are circuitry located on a single integrated circuit or within a same device. However, the microcontroller may include any number of separate integrated circuits or separate devices interconnected with each other. Also for example, a microcontroller or portions thereof may be soft or code representations of physical circuitry or of logical representations convertible into physical circuitry. As such, a microcontroller may be embodied in a hardware description language of any appropriate type.

Furthermore, those skilled in the art will recognize that boundaries between the functionality of the above-described operations is merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. However, other modifications, variations and alternatives are also possible. The specification and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

Alterations and modifications may be made to the above without departing from the scope of the invention.

The invention claimed is:

1. A microcontroller device, comprising:
 a receiver component configured to receive one or more reset signals for the microcontroller device from internal reset sources;
 an identification component configured to identify a source of each of the one or more reset signals received by the receiver component;
 a time interval determining component configured to determine a length of a time interval in accordance with the identified source of each of the one or more reset signals received by the receiver component, the length of the time interval being unique for the identified source;
 a voltage setting component configured to set a voltage of a reset output signal on a reset output pin of the microcontroller device to a first value on receipt of a reset signal by the receiver component; and
 a control component configured to maintain the voltage of the reset output signal at the first value for the duration of the determined length of the time interval; and to set the voltage of the reset output signal to a second value on substantial completion of the determined length of the time interval.

2. A microcontroller kit comprising the microcontroller device as claimed in claim 1 and a microcontroller debugging device.

3. A wireless communications device comprising the microcontroller device as claimed in claim 1.

4. An automobile comprising the microcontroller device as claimed in claim 1.

5. The microcontroller device as claimed in claim 1 wherein the receiver component is configured to receive one or more reset signals for the microcontroller device from external reset sources via a reset input pin of the microcontroller device.

6. A microcontroller debugging device configured to receive the reset output signal of the microcontroller device as claimed in claim 5, wherein the microcontroller debugging device comprises:
a voltage level detector configured to detect changes in the voltage of the reset output signal;
a clocking component configured to determine a duration of a time interval during which the voltage of the reset output signal substantially matches the first value; and
a logic unit configured to relate the duration of the time interval to a particular source of a reset signal in the microcontroller device.

7. A microcontroller kit comprising the microcontroller device as claimed in claim 5 and a microcontroller debugging device.

8. A wireless communications device comprising the microcontroller device as claimed in claim 5.

9. An automobile comprising the microcontroller device as claimed in claim 5.

10. A microcontroller debugging device configured to receive the reset output signal of the microcontroller device as claimed in claim 1, wherein the microcontroller debugging device comprises:
a voltage level detector configured to detect changes in the voltage of the reset output signal;
a clocking component configured to determine a duration of a time interval during which the voltage of the reset output signal substantially matches the first value; and
a logic unit configured to relate the duration of the time interval to a particular source of a reset signal in the microcontroller device.

11. A method of debugging a microcontroller device, wherein the method comprises:
receiving a reset signal in the microcontroller device from internal reset sources of the microcontroller device;
setting a voltage of a reset output signal on a reset output pin of the microcontroller device to a first value; determining in the microcontroller device, the source of the reset signal;
determining a length of a time interval over which the voltage of the reset output signal is to remain set at the first value, the length of the time interval being unique for the source of the reset signal;
setting the voltage of the output of the microcontroller device to a second value on substantial completion of the determined time interval;
detecting in a debugger, the setting of the voltage of the reset output signal of the microcontroller device to the first value;
determining the length of time for which the voltage of the reset output signal of the microcontroller device remains at the first value; and
associating the determined length of time with a source of a reset signal to determine the particular source of the reset signal in the microcontroller device.

12. The method as claimed in claim 11 wherein the method comprises receiving a reset signal from external reset sources via a reset input pin of the microcontroller device.

13. The method as claimed in claim 12 wherein determining a length of a time interval over which the voltage of the output is to remain set at the first value comprises reviewing a look up table to find an entry substantially matching the source of the reset signal; and retrieving from the look up table a value of a length of a time interval associated with the matching entry.

14. The method as claimed in claim 12 wherein determining a length of a time interval over which the voltage of the output is to remain set at the first value comprises calculating the length in accordance with the expression $.\tau^*(i)=.\tau+\alpha i\Delta$, wherein $.\tau$ is a nominal reset pulse duration, $\Delta$ is a constantly valued supplementary reset pulse duration and $\alpha i$ is a scaling factor, whose value varies according to the source of the reset signal.

15. The method as claimed in claim 11 wherein determining a length of a time interval over which the voltage of the output is to remain set at the first value comprises reviewing a look up table to find an entry substantially matching the source of the reset signal; and retrieving from the look up table a value of a length of a time interval associated with the matching entry.

16. The method as claimed in claim 11 wherein determining a length of a time interval over which the voltage of the output is to remain set at the first value comprises calculating the length in accordance with the expression $\tau(i)=\tau+\alpha i\Delta$, wherein r is a nominal reset pulse duration, $\Delta$ is a constantly valued supplementary reset pulse duration and $\alpha i$ is a scaling factor, whose value varies according to the source of the reset signal.

17. A non-transitory machine-readable storage medium comprising a computer program comprising instructions that when executed on a programmable apparatus carry out a method of debugging a microcontroller device, the method comprises:
receiving a reset signal in the microcontroller device from internal reset sources of the microcontroller device;
setting a voltage of a reset output signal on a reset output of the microcontroller device to a first value; determining in the microcontroller device, the source of the reset signal;
determining a length of a time interval over which the voltage of the reset output signal is to remain set at the first value, the length of the time interval being unique for the source of the reset signal;
setting the voltage of the output of the microcontroller device to a second value on substantial completion of the determined time interval;
detecting in a debugger, the setting of the voltage of the reset output signal of the microcontroller device to the first value;
determining the length of time for which the voltage of the reset output signal of the microcontroller device remains at the first value; and associating the determined length of time with a source of a reset signal to determine the particular source of the reset signal in the microcontroller device.

18. A non-transitory machine-readable storage medium of claim 17 wherein the method comprises receiving a reset signal from external reset sources via a reset input pin of the microcontroller device.

19. A non-transitory machine-readable storage medium of claim 17 wherein determining a length of a time interval over which the voltage of the output is to remain set at the first value comprises reviewing a look up table to find an entry substantially matching the source of the reset signal; and retrieving from the look up table a value of a length of a time interval associated with the matching entry.

20. A non-transitory machine-readable storage medium of claim 17 wherein determining a length of a time interval over which the voltage of the output is to remain set at the first value comprises calculating the length in accordance with the expression $\tau^*(i)=\tau+\alpha_i\Delta$, wherein $\tau$ is a nominal reset pulse duration, $\Delta$ is a constantly valued supplementary reset pulse duration and $\alpha_i$ is a scaling factor, whose value varies according to the source of the reset signal.

* * * * *